(12) United States Patent
Joseph et al.

(10) Patent No.: US 6,405,292 B1
(45) Date of Patent: Jun. 11, 2002

(54) SPLIT PENDING BUFFER WITH CONCURRENT ACCESS OF REQUESTS AND RESPONSES TO FULLY ASSOCIATIVE AND INDEXED COMPONENTS

(75) Inventors: Douglas J. Joseph; Maged M. Michael, both of Danbury, CT (US); Ashwini Nanda, Mohegan Lake, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/477,537

(22) Filed: Jan. 4, 2000

(51) Int. Cl.[7] ............................................. G06F 12/00
(52) U.S. Cl. ..................... 711/150; 711/156; 711/168; 711/149; 711/131
(58) Field of Search ................................ 711/149, 131, 711/150, 151, 156, 168, 154, 128

(56) References Cited

U.S. PATENT DOCUMENTS

| | | | | |
|---|---|---|---|---|
| 5,701,422 A | * | 12/1997 | Kirkland, Jr. et al. | 710/129 |
| 5,745,732 A | * | 4/1998 | Cherukuri et al. | 711/168 |
| 5,752,260 A | * | 5/1998 | Liu | 711/129 |
| 5,761,712 A | * | 6/1998 | Tran et al. | 711/126 |
| 5,809,536 A | * | 9/1998 | Young et al. | 711/144 |
| 5,848,434 A | * | 12/1998 | Young et al. | 711/144 |
| 5,860,120 A | * | 1/1999 | Young et al. | 711/156 |
| 5,895,487 A | * | 4/1999 | Boyd et al. | 711/122 |
| 5,991,819 A | * | 11/1999 | Young | 709/253 |
| 6,078,997 A | * | 6/2000 | Young et al. | 711/144 |

* cited by examiner

Primary Examiner—Hong Kim
(74) Attorney, Agent, or Firm—Scully, Scott Murphy & Presser; Robert P. Tassinari

(57) ABSTRACT

For a cache-coherent controller for a multiprocessor system sharing a cache memory, a split pending buffer having two components: a fully-associative part and an indexed part that can easily be made multi-ported. The associative part, PBA, include multiple entries having a valid bit and address fields, and the indexed part, PBC, includes entries including all the other status fields (i.e., the content part of the pending buffer entries). The split multi-ported pending buffer enables one request and one or more responses to be handled concurrently. Handling a request requires an associative lookup of PBA, a possible directory lookup, a possible read of PBC (in case of collision), and after processing the request in a request protocol handling unit, a possible PBA update, a possible PBC update, and a possible directory update, depending upon the cache coherence protocol implemented. Handling a response requires no PBA lookup, no directory lookup, a PBC read, and after processing the response in a response protocol handling unit, a possible PBA update, a possible PBC update, and a possible directory update, depending upon the cache coherence protocol implemented.

18 Claims, 3 Drawing Sheets

SPLIT PENDING BUFFER WITH CONCURRENT ACCESS OF REQUESTS AND RESPONSES TO FULLY ASSOCIATIVE AND INDEXED COMPONENTS

BACKGROUND OF THE INVENTION

1. Field of the Invention

The present invention relates to systems for processing memory requests in cache coherent distributed shared memory multiprocessor servers and, more specifically, to a system for achieving more efficient processing throughput and parallelism in the protocol processing of coherence operations in the coherence controllers of such servers.

2. Discussion of the Prior Art

The coherence controllers of cache coherent distributed shared memory multiprocessor systems use pending buffers to maintain the status of memory transactions in progress. They also provide a means for detecting collisions (i.e., multiple concurrent operations to the same memory address).

FIG. 1 illustrates a representation of such a multiprocessor system comprising a network 100 including one or more compute nodes 110a, . . . , 110n. Each compute node includes one or more processors with associated caches 120a, . . . , 120n, one or more shared/remote caches 130a, . . . , 130n, one or more main memory modules 140a, . . . , 140n, at least one memory directory 150a, . . . , 150n, at least one coherence controller 160a, . . . , 160n, and several I/O devices (not shown). FIG. 2 illustrates a representation of the coherence controller 160 (also 200), including at least one network interface 210, at least one node interface 220, input operation queues 230, and one or more protocol engines 240. Each protocol engine 240 typically includes one pending buffer 250, one directory controller 260, and at least one protocol handling unit 270.

FIG. 3 illustrates a representation of a pending buffer 250 (also 300) which comprises "e" pending buffer entries 310, labeled entry 0 to entry e-1, where "e" is usually a power of 2. Each pending buffer entry 310 includes a valid bit 320, that indicates whether the contents of the entry are in use or not, an address 330 that indicates the memory line to which the pending buffer entry corresponds if the valid bit is set to 'TRUE', and other status fields 340 that indicate the status of the addressed memory line. Examples of status fields 340, to name a few, are current directory state, directory state at beginning of transaction, requester id, pending buffer index of original incoming request, identifiers ("ids") of nodes expected to send responses, ids of nodes whose responses have been received, etc.

It is the case that pending buffers allow memory transactions to be split into request and response components that can be processed asynchronously without preventing the coherence controllers from processing other memory coherence transactions in between requests and responses. Pending buffers are generally implemented as small fully-associative buffers that can be quickly queried to determine if other transactions for the same memory address are in progress (collision). If the coherence controller is multiple issue (i.e. capable of receiving multiple operations in one cycle), the pending buffer needs to be multi-ported to match the throughput of the coherence controller and allow it to achieve its peak throughput. Unfortunately, implementing multi-ported fully-associative buffers is impractical unless the buffers are very small (smaller than the sizes that are usually needed for pending buffers). Thus there exists the need for a different organization of the pending buffer to enable processing of multiple operations concurrently.

SUMMARY OF THE INVENTION

It is an object of the present invention to provide a split pending buffer including a first fully-associative part and a second indexed part that is multi-ported.

The present invention leverages the fact that only a part of the pending buffer needs to be accessed associatively. In almost all systems, responses to the coherence controller always correspond to a request originating from that same coherence controller. Thus, according to the invention, by including the index of the pending buffer entry associated with a request in the associated one or more outgoing request messages, and by including the same index in incoming response messages associated with that request, the original coherence controller can use the index to locate the associated pending buffer entry without need for accessing the valid bit and address fields of the pending buffer and without need for associative lookup of the pending buffer searching for a matching address in a valid entry.

Consequently, associative lookups in the pending buffer are only needed for the processing of incoming requests in order to check for collision and in the absence of collision to allocate a new pending buffer entry. According to the present invention as incoming responses include the index of the intended pending buffer entry, no associative lookup in the pending buffer is needed.

Furthermore, since associative lookup is only needed for the address and valid bit fields of the pending buffer entries, only a part of the pending buffer needs to be implemented using fully-associative memory, while the rest can be implemented using indexed multi-ported memory. Also, only incoming requests need to perform directory lookups, while responses only use the directory state as maintained in the status fields of the corresponding entry in the pending buffer.

Allowing coherence controllers to handle multiple operations concurrently provides a dramatic increase of their throughput, and a clear significant effect of increased coherence controller throughput improves overall system performance for distributed shared memory servers.

Accordingly, the present invention is directed to splitting the pending buffer into two components: a fully-associative part and an indexed part that can easily be made multi-ported.

The associative part, Pending Buffer Address, hereinafter labeled PBA, contains the valid bit and address fields and the indexed part, Pending Buffer Content. hereinafter labeled PBC, includes all the other status fields (i.e., the content part of the pending buffer entries). The split multi-ported pending buffer thus enables one request and one or more responses to be handled concurrently. Handling a request requires an associative lookup of PBA, a directory lookup, a possible read of PBC (in case of collision), and after processing the request in a request protocol handling unit, a possible PBA update, a possible PBC update, and a possible directory update, depending upon the cache coherence protocol implemented. Handling a response requires no PBA lookup, no directory lookup, a PBC read, and after processing the response in a response protocol handling unit, a possible PBA update, a possible PBC update, and a possible directory update, depending upon the cache coherence protocol implemented.

For example to allow a pending buffer to be able to handle one request and one response concurrently, the PBC may be implemented using a memory module with a read port and a write port. For each additional response to be handled concurrently an extra read and write port pair is needed.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 4:
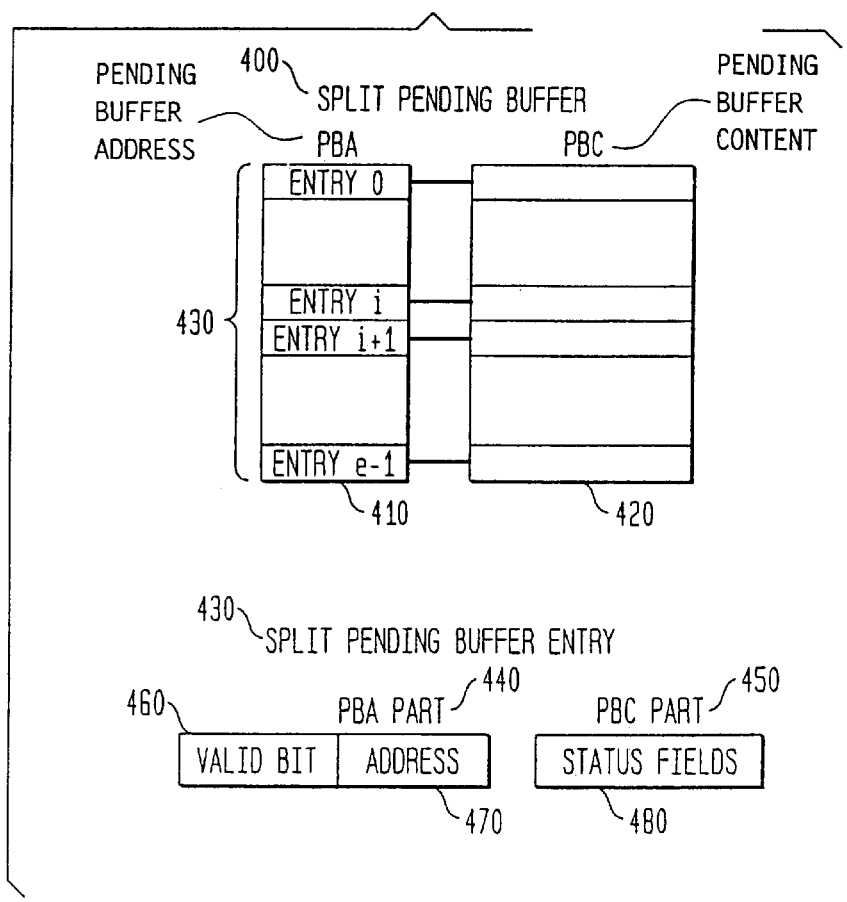
FIG. 4 illustrates one embodiment of a split pending buffer according to the present invention.

FIG. 4 depicts one embodiment of a split pending buffer of the present invention. A split pending buffer 400 consists of two components PBA 410 and PBC 420. PBA 410 is a fully-associative and single-ported module and PBC 420 is an indexed multi-ported module. A split pending buffer is organized into a set of "e" split pending buffer entries 430, where "e" is usually a power of 2. Each split pending buffer entry 430 contains two components: a PBA part 440 and a PBC part 450. The PBA part of a split pending buffer entry 440 is in the PBA 410 and consists of the valid bit 460 and address 470 fields. The PBC part of a split pending buffer entry 450 is in the PBC 420 and consists of the status fields 480.

Figure 5:
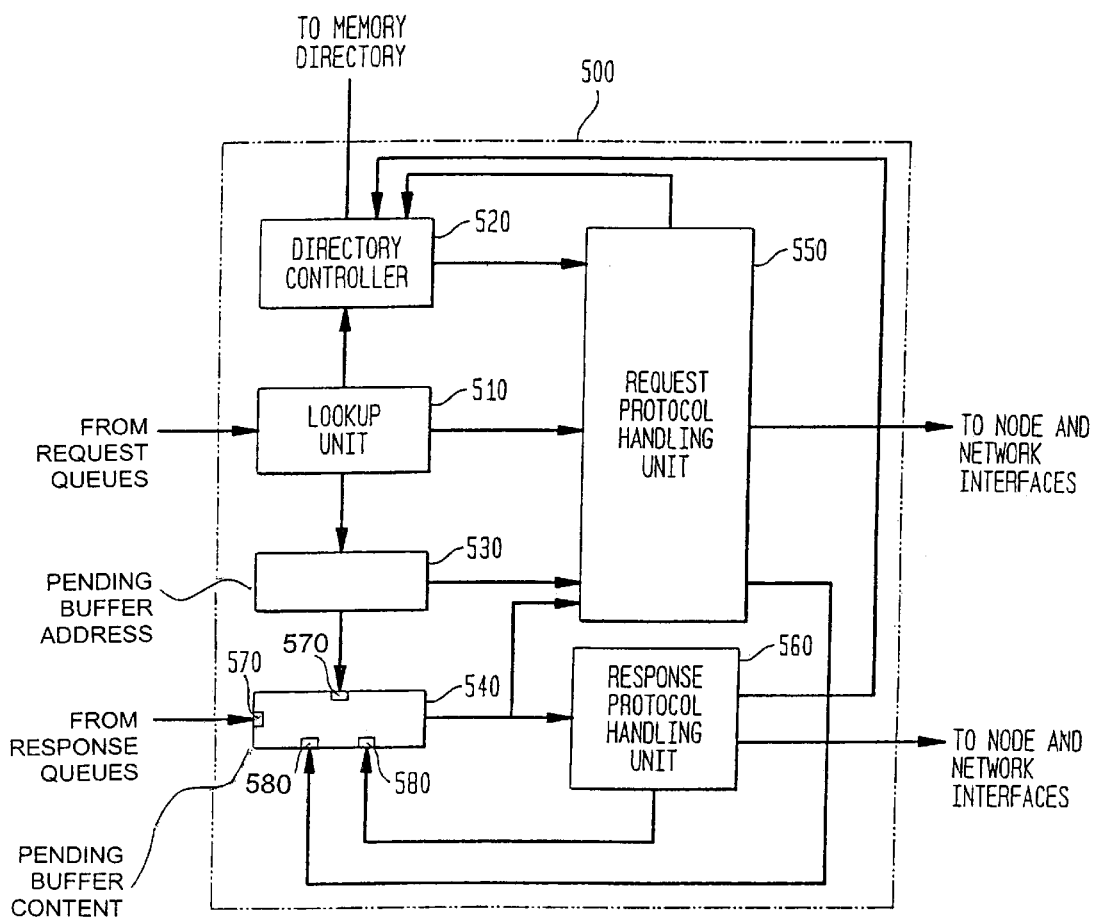
FIG. 5 illustrates one embodiment of a protocol engine including a split pending buffer of the present invention.

FIG. 5 illustrates the organization of a protocol engine with a split pending buffer of the present invention. Such a protocol engine 500 consists of a lookup unit 510, a directory controller 520, a PBA 530, a PBC 540, a request protocol handling unit 550, and a response protocol handling unit 560. The PBC 540 is multi-ported with multiple read ports 570 and write ports 580.

When a request message intended for a protocol engine 500 arrives at the input operation queues 230 of the coherence controller 200 (FIG. 2), it is forwarded to the protocol engine's lookup unit 510. Example types of request messages include, but are not limited to, requests for reading data, writing data and invalidating copies of data, etc. In the general case, the look-up unit 510 may be commanded to perform the look-up at the directory controller 520 of the node having the memory directory in order to retrieve information as to where the requested memory location is cached in the whole system. For example, in a multinode system, it will be readily determined in memory directory the state of the cache line, e.g., which node(s) has control, which has exclusive read permission, or read/write permission, etc. and including a list providing those nodes that may have read-only permission. The information retrieved from the memory directory is forwarded to the request protocol handling unit 550 for further processing. The look-up unit is additionally commanded to perform a pending buffer look-up in the PBA 530 to determine if there are any pending (existing) transaction requests for the same address, i.e., collisions. For example, the coherence controller of one node may be waiting for a response for another request for the same line. Thus, if a collision is detected, the current requesting node (arriving request) may have to wait, or may be directed to try later, for example.

The contents of the request message is then forwarded to the request protocol handling unit 550 along with the result of the memory directory look-up retrieved from the directory controller 520. If the lookup in the PBA 530 detects collision by finding an existing valid (i.e. valid bit 460 set to "true") entry 440 and a matching address 470 (i.e., the address that uniquely identifies the requested cache memory line), then the PBA invokes a read in the PBC 540 of the PBC component of the matching pending buffer entry 450 using one of the read ports 570 dedicated for that purpose and the result along with the index of the entry 430 is additionally forwarded to the request protocol handling unit 550. If no collision is detected in the PBA 530, a new entry 440 is allocated and its index is forwarded to the request protocol handling unit 550. When all the information (i.e., request message, directory state, index of entry in the pending buffer, and if necessary, the fields of the PBC entry, e.g., wait state information, or information about the existing request that may influence the decision about what to do about the arriving request according to the particular protocol in the case of detected collision) is forwarded to the request protocol handling unit 550, the request may then be handled in one or more of the following ways in accordance with a particular request protocol: (1) invoking messages (e.g., requests or responses) to the network 210 or the local node interface 220 of the coherence controller; (2) accordingly, updating the directory via the directory controller 520; (3) updating the PBC 540 through a dedicated write port 580 (e.g., insert a "waiting for response" type indication when a request message requesting exclusive read permission is sent from a first node to a second node (having the copy) and the first node has to wait for the response); and (4) invalidating the PBA entry (i.e. setting valid bit 460 to "false", for example, in the case when a node has finished with data).

In further view of FIG. 5, when a response message intended for a protocol engine 500 arrives at the input operation queues 230 of the coherence controller 200, it is forwarded to the protocol engine's PBC 540. Using an index included in the message, a read operation is invoked in the PBC using a dedicated read port 570. The results of the read along with the contents of the response message are forwarded to the response protocol handling unit 580. In the response protocol handling unit 580, the response is handled in one or more of the following ways in accordance with a particular response protocol: (1) invoking messages to the network 210 or node interface 220 (FIG. 2) of the coherence controller; (2) directory update to the directory controller 520; (3) PBC 540 update through a dedicated write port 580; and, (4) PBA entry invalidation (i.e., setting valid bit 460 to "false", for example, in the case when another node now has data exclusivity).

In an example scenario, when three nodes have a shared copy of data, and a first node wants exclusivity, it sends invalidation request messages to both second and third nodes. Assuming it only receives a response from the second node, the first node must still wait for a response message from the third node. In accordance with the particular protocol, the first node will wait for the response message from the third node and will not update the memory directory (step (2)) because it is not yet finished; meanwhile the PBC content for the pending buffer entry is updated (step (3)) to reflect that it has received a response from the second node, but is still waiting for the response from the third node. Accordingly, the PBA entry invalidation is not yet performed. When the response message is finally received from the third node, the coherence controller of the first node will initiate the update of the memory directory to indicate that the first node now has exclusive copy and, further the PBA entry will then be updated (step (4)) to indicate that the third node no longer has exclusivity. While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims. For example, without departing from the spirit and scope of the invention, a different number of read and write ports can be used in the PBC. Furthermore, in some designs separate protocol engines can be dedicated for local and remote requests and a remote protocol engine does not need to access the memory directory and thus does not include a directory controller.

Having thus described our invention, what we claim as new, and desire to secure by Letters Patent is:

1. A split pending buffer for a cache-coherent memory control system, said buffer comprising:
   a first fully-associative array component having one or more entries corresponding to memory locations of a shared memory system involved in a pending transaction associated with a received request message, each entry storing content for indicating shared use of a corresponding memory location during processing of received transaction request messages; and
   a second array component having indexable entries corresponding with entries of said first array component, each entry storing content for tracking status of said pending transaction requests for said corresponding memory location during processing of received transaction request messages and response messages, said wherein said second array includes one or more read and write ports for enabling concurrent handling of multiple transaction request messages and response messages in a processing cycle.

2. The split pending buffer as claimed in claim 1, wherein each entry in said first associative array component includes a first field indicating said shared use of said requested memory location, and a second field including an address of said requested memory location.

3. The split pending buffer as claimed in claim 2, wherein said cache-coherent memory control system includes a look-up unit for performing a pending buffer lookup in said first fully-associative array in response to a received request message.

4. The split pending buffer as claimed in claim 3, wherein said first fully-associative array performs a read in a corresponding entry of said second array component to determine said status of said pending transaction requests when shared use of the corresponding memory location is indicated during said pending buffer look-up.

5. The split pending buffer as claimed in claim 4, wherein said cache-coherent memory control system includes a protocol handling engine for handling transaction request messages received from said system, said buffer protocol handling engine for receiving content of a received transaction request message and an index of said corresponding pending buffer entry allocated for said transaction request.

6. The split pending buffer as claimed in claim 5, wherein when shared use of the corresponding memory location is indicated during said pending buffer look-up, said protocol handling engine utilizes content of a received transaction request message, an index of said corresponding pending buffer entry allocated for said transaction request, and, said status of said pending transaction requests associated with said entry for handling said response, wherein said handling includes updating said status in said corresponding second array component entry.

7. The split pending buffer as claimed in claim 5, wherein said protocol handling engine further handles received transaction responses received from said system, a response message including an index of a corresponding entry of said second array component for enabling reading of said status of said pending transaction requests associated with said entry, said protocol handling engine receiving content of said response message and said status for handling said received response, wherein said handling includes updating said status in said corresponding second array component entry.

8. A cache-coherent memory control system for a shared memory multi-processor system including a plurality of processing nodes each having access to a shared cache memory, said control system comprising:
   a) a split pending buffer comprising:
      i) a first fully-associative array component having one or more entries corresponding to memory locations of said shared cache memory involved in a pending transaction associated with a received request message, each entry storing content for indicating shared use of a corresponding memory location during processing of received transaction request messages; and
      ii) a second array component having indexable entries corresponding with entries of said first array component, each entry storing content for tracking status of said pending transaction requests for said corresponding memory location during processing of received transaction request messages and response messages;
   b) a look-up unit for performing a pending buffer lookup in said first fully-associative array in response to a received request message; and,
   c) a protocol handling means for handling said transaction request messages, said protocol handling means receiving content of a received transaction request message, and, an index of said corresponding pending buffer entry allocated for said transaction request for determining said handling, said second array including at least one read port and at least one write port for enabling concurrent handling of multiple transaction request messages and response messages in a single processing cycle.

9. The cache-coherent memory control system as claimed in claim 8, wherein when shared use of the corresponding memory location is indicated during said pending buffer look-up, said protocol handling means further receiving said status of said pending transaction requests associated with said entry, and utilizing said content, index, and status information for determining said handling.

10. The cache-coherent memory control system as claimed in claim 9, wherein said determined handling includes forwarding further messages to a processing node having a multiprocessor involved in a pending memory transaction.

11. The cache-coherent memory control system as claimed in claim 10, further including a processing node having memory directory storing address information pertaining to said shared cache memory, and corresponding directory control means for updating said memory directory, said determined handling including forwarding a message to said processing node having said memory directory for updating said memory directory.

12. The cache-coherent memory control system as claimed in claim 9, wherein said determined handling includes updating said status in said corresponding second array component entry via a write port.

13. The cache-coherent memory control system as claimed in claim 9, wherein said determined handling includes updating said entry storing content for indicating shared use of a corresponding memory location in said first fully-associative array component.

14. The cache-coherent memory control system as claimed in claim 8, wherein said protocol handling means further handles transaction response messages received from a multi-processor sharing a memory location, said response message including an index for reading an entry in said second array component, said protocol handling means receiving said response message and said status content of said indexed entry for determining said handling.

15. The cache-coherent memory control system as claimed in claim 14, wherein said determined handling includes forwarding further messages to a processing node having a multiprocessor involved in a pending memory transaction.

16. The cache-coherent memory control system as claimed in claim 15, further including a processing node having memory directory storing address information pertaining to said shared cache memory, and corresponding directory control means for updating said memory directory, said determined handling including forwarding a message to said processing node having said memory directory for updating said memory directory.

17. The cache-coherent memory control system as claimed in claim 14, wherein said determined handling includes updating said status in said corresponding second array component entry via a write port.

18. The cache-coherent memory control system as claimed in claim 14, wherein said determined handling includes updating said entry storing content for indicating shared use of a corresponding memory location in said first fully-associative array component.

* * * * *

UNITED STATES PATENT AND TRADEMARK OFFICE
CERTIFICATE OF CORRECTION

PATENT NO.      : 6,405,292 B1
DATED           : June 11, 2002
INVENTOR(S)     : Douglas J. Joseph It is certified that error appears in the above-identified patent and that said Letters Patent is hereby corrected as shown below:

<u>Title page,</u>
Item [75], "Corp." should read -- Corporation --

Figure 1:
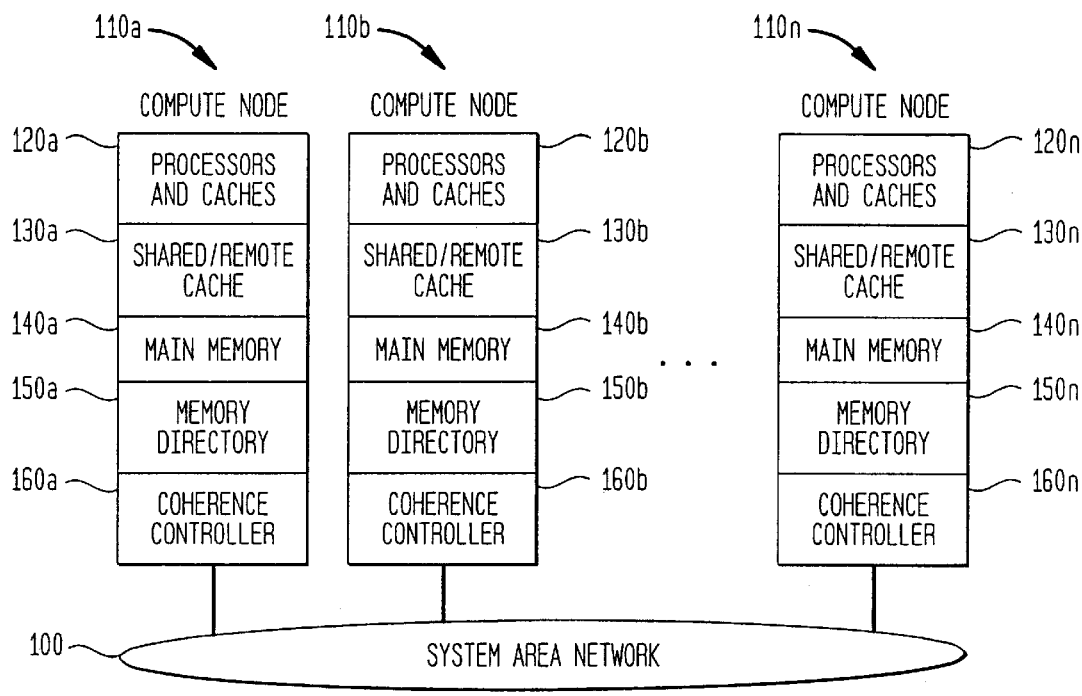
FIG. 1 illustrates an example of a system environment incorporating split, pending buffer of the current invention.
Figure 2:
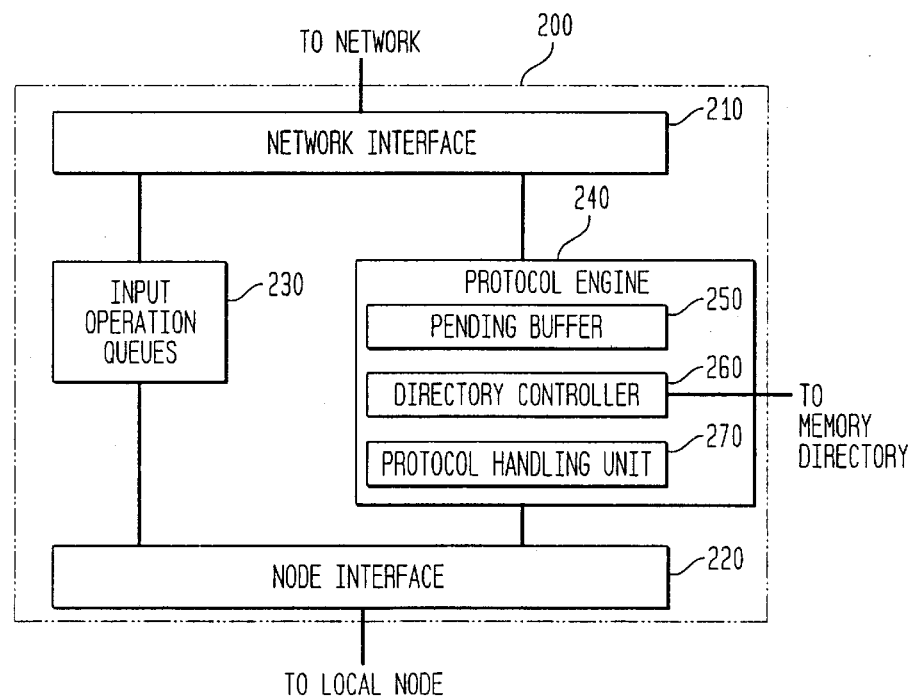
FIG. 2 illustrates an example of a conventional coherence controller.
Figure 3:
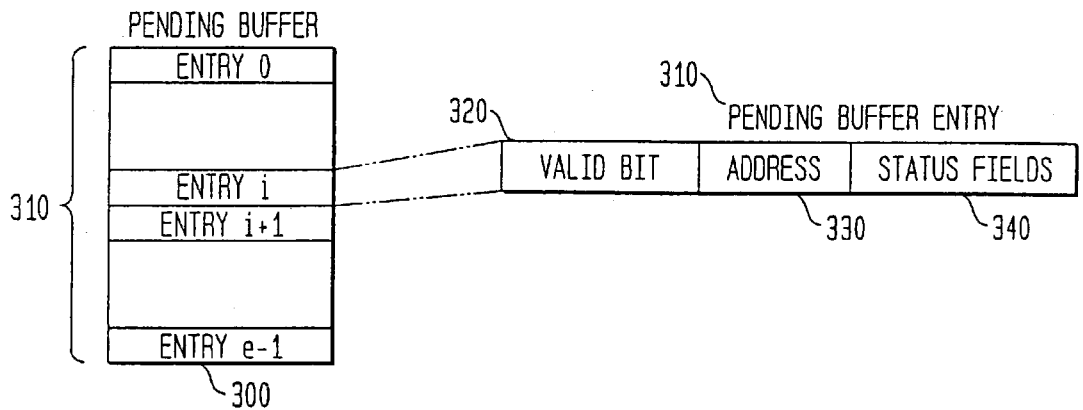
FIG. 3 illustrates an implementation of a conventional pending buffer.

<u>Column 1,</u>
Line 29, "Fig. 2…" should begin a new paragraph.

<u>Column 5,</u>
Line 2, "While the invention…" should begin a new paragraph.

Signed and Sealed this

Twenty-eighth Day of January, 2003

JAMES E. ROGAN
*Director of the United States Patent and Trademark Office*